F. W. CRAGE.
GEARING.
APPLICATION FILED JULY 5, 1911.
1,022,181.
Patented Apr. 2, 1912.
2 SHEETS—SHEET 2.
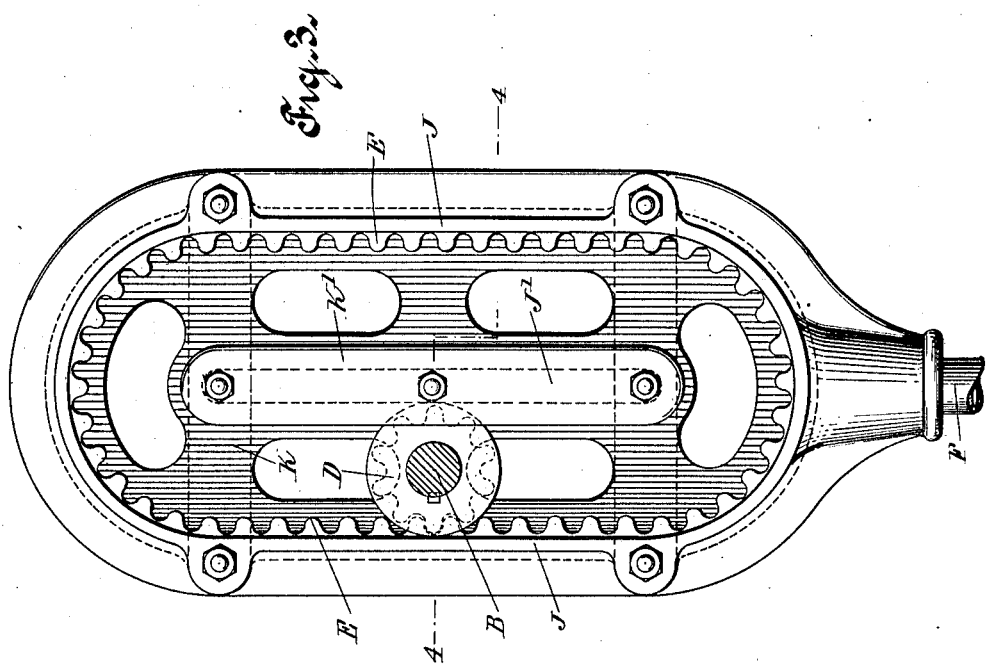
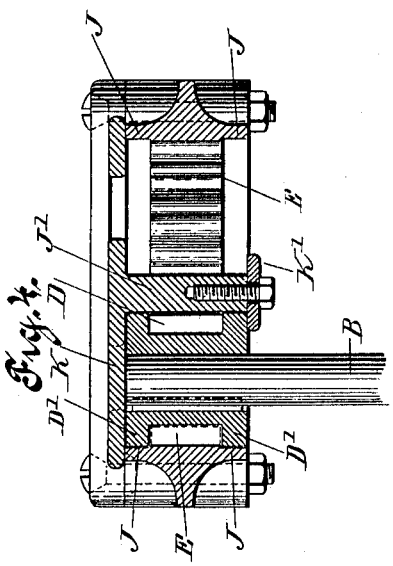
WITNESSES
INVENTOR
Frederick William Crage
BY
ATTORNEYS

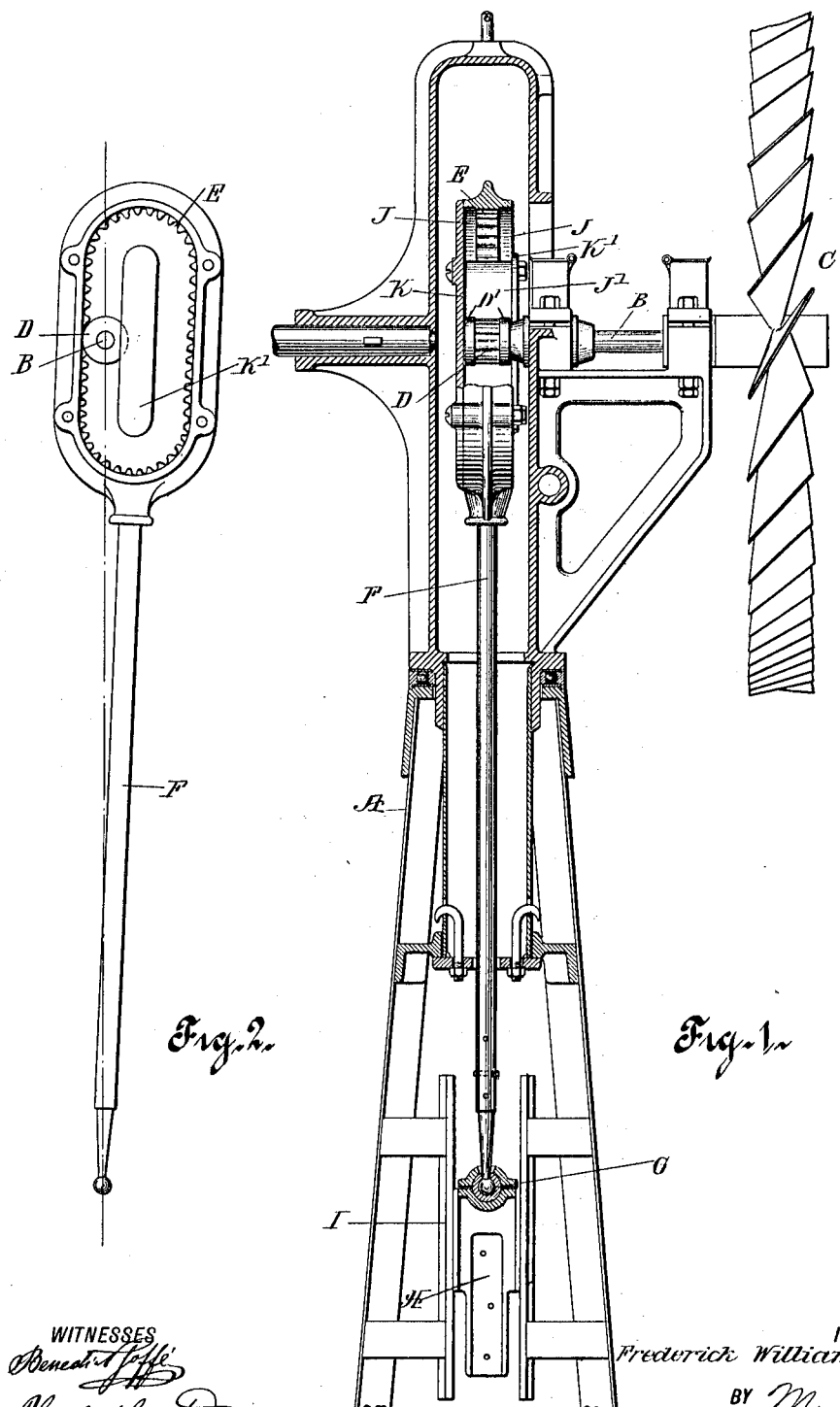

UNITED STATES PATENT OFFICE.

FREDERICK WILLIAM CRAGE, OF PORT ELIZABETH, CAPE COLONY.

GEARING.

1,022,181.  Specification of Letters Patent.  Patented Apr. 2, 1912.

Application filed July 5, 1911.  Serial No. 636,948.

*To all whom it may concern:*

Be it known that I, FREDERICK WILLIAM CRAGE, a subject of the King of Great Britain, and a resident of Port Elizabeth, in the Province of Cape of Good Hope, Cape Colony, South Africa, have invented a new and Improved Gearing, of which the following is a full, clear, and exact description.

The object of the invention is to provide a new and improved gearing for use on wind mills, deep well pumping frames and other machinery, and arranged to convert rotary motion into rectilinear reciprocating motion, at the same time producing an exceedingly long stroke and insuring a transmission of power with a minimum loss of friction.

For the purpose mentioned, use is made of a flanged pinion secured on a revoluble shaft and in mesh with a loop rack or elongated internal gear wheel having a stem pivotally connected with a sliding cross head.

A practical embodiment of the invention is represented in the accompanying drawings forming a part of this specification, in which similar characters of reference indicate corresponding parts in all the views.

Figure 1 is a sectional elevation of the gearing as applied to a wind mill; Fig. 2 is a face view of the pinion and the rack; Fig. 3 is an enlarged face view of the same; and Fig. 4 is a sectional plan view of the same on the line 4—4 of Fig. 3.

On the tower A of a wind mill or other piece of machinery is journaled a shaft B rotated by suitable power, such, for instance, as a wind wheel C secured on the shaft B, and on the latter is secured a pinion D, in mesh with a loop rack or elongated internal gear wheel E, provided at one end with a stem F having a pivotal connection G with a cross head H mounted to slide in guideways I and connected with a pump or other machinery to be actuated. When the shaft B is rotated, the pinion D, in mesh with the loop rack E, causes the latter to move up and down and in doing so imparts an up and down swinging motion to the cross head H, thus converting the rotary motion of the shaft B into reciprocating rectilinear motion. The pinion D is provided at the ends of its teeth with flanges D' mounted to travel on a guideway concentric with the teeth of the rack E, the said guideway having outer continuous members J at the ends of the teeth of the rack E and extending along the base thereof, and an inner member J' arranged in the form of a web in the middle of the rack E, as plainly indicated in the drawings. Thus the flanges D' of the pinion D travel on the members J and J' so as to keep the rack E in mesh with the pinion D to impart an up and down motion to the rack E whenever the pinion D is rotated, as previously mentioned. The rack E is provided with a back flange K and a flange K' is bolted or otherwise fastened to the front of the guideway J' to extend over the faces of the pinion D to hold the latter against literal movement.

From the foregoing it will be seen that by the arrangement described the rack E is properly guided, and the positive driving thereof takes place on rotating the pinion D so that the power of the shaft B is transmitted through the reciprocating cross head H, with a minimum loss of friction, and it is evident that any desired stroke can be given to the cross head by increasing the length of the rack E correspondingly.

Having thus described my invention, I claim as new and desire to secure by Letters Patent:—

A gearing for converting rotary motion into reciprocating rectilinear motion, comprising a revoluble pinion provided at each end with a flange rigid therewith, an elongated loop having on its inner face at the center thereof teeth with which the pinion meshes, the portions of the loop at the sides of the teeth forming guideways for the flanges of the pinion, a plate secured upon one face of the loop and provided with an elongated member projecting centrally into the loop and having its outer end flush with the other face of the loop, said member forming a central guideway, for the flanges of the pinion, and a plate of a length and width greater than that of the said member and secured thereto.

In testimony whereof I have signed my name to this specification in the presence of two subscribing witnesses.

FREDERICK WILLIAM CRAGE.

Witnesses:
J. H. MORRIS,
E. J. HART.

Copies of this patent may be obtained for five cents each, by addressing the "Commissioner of Patents, Washington, D. C."